Patented Jan. 6, 1953

2,624,724

UNITED STATES PATENT OFFICE 2,624,724

POLYMERIZATION OF VINYL CHLORIDE IN AN AQUEOUS EMULSION

Harold F. Park, East Longmeadow, Mass., assignor to Monsanto Chemical Company, St. Louis, Mo., a corporation of Delaware No Drawing. Application February 26, 1948, Serial No. 11,360

5 Claims. (Cl. 260—92.8)

This invention relates to the aqueous emulsion polymerization of vinyl chloride-containing materials.

Polyvinyl chloride emulsions are well known to those skilled in the art and have proved to be useful for many purposes. However, the recovery of the polymeric material from prior art emulsions has been difficult and expensive when products of a high degree of purity are desired. Thus, it has been found necessary to coagulate, wash thoroughly and then dry the washed product. Attempts to dry the emulsion directly without coagulation and washing have resulted in products of inferior properties. For example, such products are deficient in electrical resistance, heat stability and the like.

It is an object of this invention to provide a new process for the emulsion polymerization of vinyl chloride-containing materials. A further object of this invention is to provide emulsions of vinyl chloride-containing polymers which may be dried directly to produce products having a high degree of heat stability. Another object is to provide a process for preparing polyvinyl chloride-containing emulsions which may be dried directly to produce products having good electrical properties.

These and other objects are attained according to this invention by preparing a mixture of water, vinyl chloride-containing polymerizable material, water-soluble per compound catalyst and a dispersing agent, at a pH of 5–8 and then polymerizing the polymerizable material while slowly agitating the mixture, the amount of catalyst being such as to supply not over 0.01 part of available oxygen for every 100 parts of water and the amount of dispersing agent not exceeding 0.5 part for every 100 parts of monomer.

Surprisingly, it is found that by carrying out the polymerization in this manner, stable emulsions of the resulting polymer are produced and after drying the emulsions, polymeric products are recovered having an exceptionally high degree of heat stability and electrical resistance.

The following examples are illustrative of the present invention, but are not to be construed as limitative thereof. Where parts are given, they are parts by weight.

Example I

| | Parts |
|---|---|
| Vinyl chloride (air free) | 1500 |
| Water (air free) | 1500 |
| Potassium hydroxide | 0.45 |
| Sodium sulfonate of dioctyl succinate | 0.3 |
| Potassium persulfate | 0.075 |

All of the above ingredients except the vinyl chloride are placed in a glass-lined autoclave and stirred to form a homogeneous solution. After displacing the air in the autoclave with carbon dioxide, the vinyl chloride is added and the mixture agitated slowly while being heated at 50° C. for 5 hours. Thereafter, residual monomer is allowed to evaporate and the emulsion is direct dried, for example, by spray drying or drum drying.

The polyvinyl chloride obtained by the above process is found to have excellent electrical properties, good water resistance and a high degree of heat stability.

Example II

| | Parts |
|---|---|
| Vinyl chloride (air free) | 1500 |
| Water (air free) | 1500 |
| Potassium hydroxide | 0.75 |
| Sodium sulfonate of dioctyl succinate | 1.5 |
| Potassium persulfate | 0.035 |

The same procedure is followed for carrying out the polymerization as is used in Example I, except that the heating and stirring at 50° C. are continued for 9 hours. The polymer which is obtained has properties substantially those of the product in Example I, except that it has even better heat stability.

Example III

| | Parts |
|---|---|
| Vinyl chloride (air free) | 50 |
| Water (air free) | 50 |
| Sodium bicarbonate | 0.05 |
| Sodium salt of pine oil sulfonic acid | 0.09 |
| Potassium persulfate | 0.018 |

The water and the potassium persulfate are placed in a glass-lined autoclave and stirred to form a homogeneous solution. While continuing the agitation, the sodium bicarbonate is introduced and after this ingredient has dissolved, the sodium salt of pine oil sulfonic acid is added. When the mixture becomes uniform, it is cooled to −15° C. and after displacing the air in the autoclave with carbon dioxide, the vinyl chloride is introduced and the autoclave closed. The reaction mixture is then heated to about 60° C. with stirring and heated at this temperature for 16 hours with moderate agitation. Thereafter, the autoclave is opened and the water is evaporated from the resulting emulsion of polyvinyl chloride.

The vinyl chloride polymer, after drying, is found to have properties similar to those of the product described in Example I. The product may be compression or injection molded into transparent articles which are substantially colorless and possess a high degree of strength and toughness.

Example IV

| | Parts |
|---|---|
| Vinyl chloride (air free) | 120 |
| Water (air free) | 120 |
| Potassium hydroxide | 0.027 |
| Sodium sulfonate of dioctyl succinate | 0.44 |
| Sodium persulfate | 0.01 |

The water, potassium hydroxide and dispersing agent are placed in a glass lined autoclave. After stirring the mixture until solution is effected, the catalyst is added and then 10 parts of Dry Ice. The autoclave is closed and the pressure allowed to increase until it reaches 125 pounds per square inch. The autoclave is then vented to release the pressure. When the Dry Ice has entirely evaporated, the vinyl chloride is introduced. Thereafter the mixture is slowly stirred and heated to 40–45° C. The stirring and heating at this temperature are continued for 5 hours. The contents of the autoclave, which comprise a polyvinyl chloride emulsion, are then discharged from the autoclave. The emulsion may be dried by evaporation on a rotary drum drier at 150–200° C. It is found that about 90% of the vinyl chloride is converted into polymer. The dried polymer may be molded into transparent articles having excellent color and transparency, good electrical properties and a high degree of mechanical strength.

Example V

| | Parts |
|---|---|
| Vinyl chloride (air free) | 30 |
| Diethyl maleate | 5 |
| Water (air free) | 50 |
| Sodium bicarbonate | 0.1 |
| Sodium sulfonate of dioctyl succinate | 0.15 |
| Potassium persulfate | 0.004 |

The dispersing agent is dissolved in the water, which is preheated to about 50° C. and the resulting solution is charged into a glass-lined autoclave. The catalyst and sodium bicarbonate are added and allowed to dissolve. After sweeping the air from the autoclave with carbon dioxide, the vinyl chloride and diethyl maleate are introduced. The autoclave is then closed and the mixture heated at 50° C. with slow agitation for 18 hours. The polymer in the resulting emulsion may be recovered by evaporating the water therefrom. The resulting polymer may be molded into clear, flexible articles of high strength and durability.

Example VI

| | Parts |
|---|---|
| Vinyl chloride (air free) | 1100 |
| Ethyl acrylate (air free) | 200 |
| Water (air free) | 1700 |
| Potassium bicarbonate | 0.5 |
| Sodium sulfonate of dioctyl succinate | 2.0 |
| Potassium persulfate | 0.2 |

All of the ingredients except the vinyl chloride and ethyl acrylate are charged to a glass-lined autoclave. After sweeping out the air from the autoclave with carbon dioxide, the resulting mixture is heated with stirring to 50° C. and while maintaining this temperature and with continuing slow agitation, a mixture of the vinyl chloride and ethyl acrylate is continuously introduced under pressure at a substantially uniform rate. About 4 hours are required to introduce the polymerizable materials. The resulting product is an emulsion of copolymerized vinyl chloride and ethyl acrylate. The copolymer is recovered by directly drying the emulsion, for example, by means of the drum drier or a spray drier. The product is found to have excellent light and heat stability. It may be formed into very tough, flexible articles, having a high degree of mechanical strength.

Example VII

| | Parts |
|---|---|
| Vinyl chloride (air free) | 30 |
| Water (air free) | 50 |
| Sodium bicarbonate | 0.05 |
| Sodium salt of a mixture of petroleum sulfonic acids | 0.09 |
| Potassium persulfate | 0.018 |

The water and catalyst are added to a glass-lined autoclave and after stirring the mixture until a solution is formed, the sodium bicarbonate is added and allowed to dissolve. The dispersing agent is then introduced and the mixture cooled to −15° C. After displacing the air with carbon dioxide, the vinyl chloride is introduced, the autoclave closed and the mixture heated at about 50° C. with slow agitation for 16 hours. The polymer in the resulting emulsion is recovered by drying the emulsion directly. The polymer which is recovered is similar in its properties to the polyvinyl chloride described in previous examples.

Example VIII

| | Parts |
|---|---|
| Vinyl chloride (air free) | 181.5 |
| Water (air free) | 226.5 |
| Potassium hydroxide | 0.03 |
| Sodium sulfonate of dioctyl succinate | 0.66 |
| Potassium persulfate | 0.011 |

The potassium hydroxide and dispersing agent are dissolved in the water contained in a glass-lined autoclave. The catalyst is added and the air substantially removed by evacuating the autoclave. The vinyl chloride is then added and the mixture heated at 30° C. with moderate agitation until the pressure within the autoclave drops to 35–40 pounds per square inch. The polyvinyl chloride is recovered in a dry form by passing the entire contents of the autoclave through a spray drier. The resulting product is similar in its characteristics to the polyvinyl chloride products described in previous examples.

Numerous variations may be introduced into the process of the invention as illustrated by the foregoing examples. For example, other polymerization temperatures may be used, the exact temperature depending in part on the nature of the materials being polymerized and the nature of the polymer desired. Usually, polymerization temperatures in the range of 10–80° C. are found to be most advantageous.

The nature and amounts of the several components of the polymerization charges may be substantially varied. In general, it is found that alkali metal sulfates or sulfonates of organic compounds may be used as the dispersing agent. Thus, in place of the sodium sulfonate of dioctyl succinate, the sodium salts of other dialkyl sulfosuccinic acid esters may be used, as for example, sodium salts of dialkyl sulfo-succinates in which the alkyl radicals contain 6–10 carbon atoms. In place of the sodium salts, other alkali metal salts may be used, such as potassium, cesium, lithium and rubidium salts. The application of the alkali metal dialkyl sulfo succinates to the vinyl chloride emulsion polymerization system is set forth in more detail in S. N. 795,153, filed December 31, 1947.

Examples of other suitable dispersing agents include the sodium sulfonates of aliphatic or alkyl-aromatic hydrocarbons of high molecular weight, such as the alkyl naphthylene sulfonic acids, sodium lauryl sulfate, sodium diisobutyl naphthalene sulfonate, decyl benzene sodium sulfonate, dodecyl benzene sodium sulfonate, octadecyl benzene sodium sulfonate, sodium disulfonate of dibutyl phenyl phenol, sodium sulfonate of higher synthetic secondary alcohols, as well as other dispersing agents of this type which are well known to those skilled in the art. In place of the sodium salts, salts of other alkali metals may be used as pointed out above in connection with the sulfo-succinates.

As pointed out above, the amount of dispersing agent used does not exceed 0.5 part for every 100 parts of monomer. Usually, however, it is desirable that at least 0.01 part be used for every 100 parts of monomer to insure stability of the emulsion during the polymerization, the exact amount employed depending in part at least, on the nature of the dispersing agent.

The catalysts used in the process of the invention comprise the water-soluble per compounds. Examples of such compounds are the alkali metal persulfates, i. e., potassium, sodium, lithium, rubidium and cesium persulfate, ammonium persulfate, morpholine persulfate, sodium perborate, sodium peracetate, urea peroxide, hydrogen peroxide, tertiary butyl hydroperoxide, ethylene diamine persulfate, alkanol amine persulfates, such as triethanol amine persulfate, diethanol amine persulfate, ethanol amine persulfate, quaternary ammonium persulfates, e. g., dimethyl dibenzyl ammonium persulfate, trimethyl benzyl ammonium persulfate, tetraethyl ammonium persulfate, tetraethanol ammonium persulfate, etc., and the like.

The maximum amount of catalyst used in the process of the invention, as indicated above, is such an amount as to supply up to 0.01 part of available oxygen for every 100 parts of water. Frequently, somewhat smaller amounts are found to be advantageous, although it is found that usually the amount of per compound should be such as to supply at least 0.0001 part of available oxygen for every 100 parts of water. Expressed on a basis of 100 parts of monomer, the amount of available oxygen should be not over the amount available in 0.06 part of potassium persulfate as shown in Example VII.

As pointed out above, the polymerization is preferably carried out at a pH of 5–8 (glass electrode). For the purpose of adjusting the initial pH of the polymerization charge to fall within these limits, such acids may be used as formic acid, acetic acid, chloracetic acid, benzene sulfonic acid, toluene sulfonic acid, nitric acid, hydrochloric acid, sulfuric acid and the like. On the other hand, when, as in Examples I—VIII the alkaline materials are needed to regulate the pH, such materials may be used as sodium bicarbonate, sodium carbonate, potassium carbonate, potassium bicarbonate, sodium hydroxide, potassium hydroxide, water-soluble amines such as ethyene diamine, quaternary ammonium bases such as dimethyl dibenzyl ammonium hydroxide, trimethyl benzyl ammonium hydroxide, tetraethyl ammonium hydroxide, tetraethanol ammonium hydroxide, alkanol amines, e. g. triethanol amine, etc.

In making aqueous emulsions from vinyl chloride-containing materials according to the process of the invention, the ratio of water to polymerizable material may be varied substantially. Usually, the weight ratio of water to the total amount of polymerizable material polymerized is not lower than 30:70 since the viscosity of the polymerizing mixture becomes too high to permit adequate agitation. On the other hand, ratios of water to polymerizable material higher than 90:10 are not usually desirable from a commercial standpoint due to the high degree of dilution and the necessity for removal of large amounts of water. A particular feature of the invention resides in the fact that emulsions having a polymer content of 40–50% or more on a weight basis may be readily prepared. Such emulsions do not require excessive expense for the removal of the water.

The process of the invention may be applied to the polymerization of vinyl chloride per se as well as to mixtures thereof with other copolymerizable materials. As examples of copolymerizable materials which may be used are such water-insoluble unsaturated compounds as vinyl esters of carboxylic acids, as for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid, vinyl aromatic compounds, for example, styrene, ortho-chlorostyrene, para-chlorostyrene, 2,5-dichlorostyrene, 2,4-dichlorostyrene, para-ethyl styrene, divinyl benzene, vinyl naphthalene, alpha-methyl styrene; dienes, such as butadiene, chloroprene; amides, such as acrylic acid amide, acrylic acid anilide; nitriles, such as crylic acid nitrile; esters of $\alpha,\beta$-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like. Preferably, in the case of copolymerization a predominate portion, i. e., more than 50% by weight of the mixture of monomers is a vinyl halide, especially vinyl chloride.

A particularly preferred embodiment of the invention comprises the polymerization of a mixture of vinyl chloride and an ester of an $\alpha,\beta$-unsaturated dicarboxylic acid such as diethyl maleate in which 5–20 parts by weight of the ester are used for every 95–80 parts by weight of vinyl chloride. Among the preferred esters of $\alpha,\beta$-unsaturated dicarboxylic acids are the alkyl esters in which the alkyl group contains 2–8 carbon atoms.

It is obvious that many variations may be made in the processes and products of this invention without departing from the spirit and scope thereof as defined in the appended claims.

What is claimed is:

1. A process which consists of polymerizing vinyl chloride in an aqueous emulsion at a pH of 5–8 in the presence of a water-soluble per compound catalyst and an alkali metal sulfonate dispersing agent and recovering the polymer by evaporating the water from the resulting emulsion, the weight ratio of water to vinyl chloride being not lower than 30:70, the amount of dispersing agent varying between 0.01 and 0.5 part per 100 parts of monomer, the amount of catalyst on a weight basis being such as to introduce for every 100 parts of monomer not over the amount of available oxygen contained in 0.06 part of potassium persulfate and not over 0.01 nor less than 0.00001 part of available oxygen for every 100 parts of water.

2. A process as defined in claim 1 in which the catalyst is a water-soluble per sulfate.

3. A process as defined in claim 1 in which the catalyst is an alkali metal per sulfate.

4. A process as in claim 1 wherein the emulsifying agent is an alkali metal sulfonate of a dialkyl succinate in which the alkyl groups contain from 6 to 10 carbon atoms.

5. A process as in claim 1 wherein the emulsifying agent is the sodium sulfonate of dioctyl succinate.

HAROLD F. PARK.

REFERENCES CITED

The following references are of record in the file of this patent:

UNITED STATES PATENTS

| Number | Name | Date |
| --- | --- | --- |
| 2,404,781 | Arnold et al. | July 30, 1946 |
| 2,414,934 | Denny | Jan. 28, 1947 |
| 2,462,354 | Brubaker et al. | Feb. 22, 1949 |
| 2,473,929 | Wilson | June 21, 1949 |

FOREIGN PATENTS

| Number | Country | Date |
| --- | --- | --- |
| 883,454 | France | July 6, 1943 |
| 589,264 | Great Britain | June 16, 1947 |